United States Patent …

(12) United States Patent
Gerber et al.

(10) Patent No.: US 9,976,609 B2
(45) Date of Patent: May 22, 2018

(54) BUSHING FOR BRAKE CALIPER GUIDE ROD FASTENERS

(71) Applicants: Kelsey-Hayes Company, Livonia, MI (US); Lucas Automotive GmbH, Koblenz (DE)

(72) Inventors: Kraig E. Gerber, Plymouth, MI (US); Markus Mallmann, Pfalzfeld (DE)

(73) Assignees: Kelsey-Hayes Company, Livonia, MI (US); Lucas Automotive GmbH, Koblenz (DE)

( * ) Notice: Subject to any disclaimer, the term of this patent is extended or adjusted under 35 U.S.C. 154(b) by 0 days. days.

(21) Appl. No.: 15/278,261

(22) Filed: Sep. 28, 2016

(65) Prior Publication Data
US 2018/0087589 A1 Mar. 29, 2018

(51) Int. Cl.
F16D 65/00 (2006.01)
F16D 55/2265 (2006.01)

(52) U.S. Cl.
CPC ..... F16D 65/0006 (2013.01); F16D 55/2265 (2013.01); F16D 65/0087 (2013.01)

(58) Field of Classification Search
CPC ............. F16D 65/0006; F16D 55/2265; F16D 65/0087
USPC ..................... 188/73.37, 73.31, 73.44, 73.45
See application file for complete search history.

(56) References Cited

U.S. PATENT DOCUMENTS

| | | | | |
|---|---|---|---|---|
| 3,976,169 A * | 8/1976 | Ogawa | ...................... | B62L 1/00 188/73.39 |
| 4,061,209 A * | 12/1977 | Gee | ................... | F16D 55/22655 188/73.36 |
| 4,261,443 A * | 4/1981 | Wright | ................ | F16D 55/2265 188/73.39 |
| 4,279,331 A * | 7/1981 | Lupertz | ............. | F16D 55/22655 188/71.8 |
| 5,526,904 A * | 6/1996 | Walden | ............. | F16D 55/22655 188/73.44 |
| 6,135,245 A * | 10/2000 | Kurasako | .......... | F16D 55/22655 188/73.45 |
| 6,223,967 B1 * | 5/2001 | Fogal | ...................... | H01L 24/85 228/4.5 |
| 6,533,079 B2 * | 3/2003 | Charmat | ........... | F16D 55/22655 188/71.8 |
| 6,540,050 B2 * | 4/2003 | Kuroyanagi | ...... | F16D 55/22655 188/73.45 |
| 7,356,901 B1 * | 4/2008 | Sherman, II | ...... | B29C 45/14426 188/73.44 |
| 2012/0234635 A1* | 9/2012 | Wake | .................... | F16D 65/092 188/73.45 |
| 2014/0231191 A1 | 8/2014 | Morais et al. | | |

* cited by examiner

Primary Examiner — Thomas J Williams
Assistant Examiner — Mariano Sy
(74) Attorney, Agent, or Firm — MacMillan, Sobanski & Todd, LLC

(57) ABSTRACT

A vehicle disc brake assembly includes a brake caliper. The brake caliper has a lug through which a bore extends, the bore having an axis. A guide rod fastener extends through the bore and is secured to a guide rod. An elastic bushing is in the bore between the lug and the guide rod fastener, wherein a circumference of the bushing contacts the lug. A radial clearance is between the lug and the guide rod fastener. The radial clearance is perpendicular to the axis.

17 Claims, 7 Drawing Sheets

BUSHING FOR BRAKE CALIPER GUIDE ROD FASTENERS

This invention relates in general to vehicle disc brake assemblies and in particular to a bushing adapted for use with a guide rod fastener in such a vehicle disc brake assembly.

An automotive vehicle is typically equipped with a brake system for slowing or stopping movement of the vehicle in a controlled manner. The brake system for an automobile or light truck typically includes a disc brake assembly for each of the front wheels and either a drum brake assembly or a disc brake assembly for each of the rear wheels. The disc and drum brake assemblies are actuated by hydraulic or pneumatic pressure generated when an operator of the vehicle depresses a brake pedal. The structures of these drum brake assemblies and disc brake assemblies, as well as the actuators therefor, are well known in the art.

A typical disc brake assembly includes a rotor which is secured to a wheel of the vehicle for rotation therewith. The rotor includes a pair of opposed friction plates which are selectively engaged by portions of a caliper assembly. The caliper is slidably supported on an anchor bracket by a pair of guide rods. The guide rods are secured to the caliper by guide rod fasteners and extend into bores in the anchor bracket. In turn, the guide rod fasteners are secured in bores in the caliper. The guide rod fasteners tightly hold the guide rods against the caliper to fix a span between the guide rods.

The anchor bracket is attached to a non-rotatable component of the vehicle, such as the vehicle frame. The caliper assembly includes a pair of brake shoes which are disposed on opposite sides of the brake rotor. The brake shoes are connected to one or more hydraulically or pneumatically actuated pistons for movement between a non-braking position, wherein the brake shoes are spaced apart from the opposed friction plates of the rotor, and a braking position, wherein the brake shoes are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

The disc brake assembly has contact between the guide rods and the anchor bracket, including during normal operation of the disc brake assembly. Such contact may produce noise, vibration, and harshness that is undesirable for the driver or other occupants of the vehicle. The noise, vibration, and harshness may be reduced by providing an elastomeric rod bushing on at least one of the guide rods. The rod bushing is installed between the guide rod and the bore of the anchor bracket in which the guide rod extends.

However, providing a bushing on one of the guide rods increases manufacturing complexity for the disc brake assembly because, typically, only one of the pair of guide rods has the bushing. For example, the bushing may be on a leading guide rod but not a trailing guide rod. Alternatively, all of the guide rods may be provided with bushings, but doing so increases manufacturing cost for the disc brake assembly. Therefore, it would be desirable to reduce noise, vibration, and harshness produced by the disc brake assembly without increasing manufacturing complexity or cost.

SUMMARY OF THE INVENTION

This invention relates to vehicle disc brake assemblies and in particular to a bushing adapted for use with a guide rod fastener in such a vehicle disc brake assembly.

According to one embodiment, a vehicle disc brake assembly may comprise, individually and/or in combination, one or more of the following features: a brake caliper having a lug, a guide rod fastener secured to a guide rod, and an elastic bushing. A bore extends through the lug and has an axis. The guide rod fastener extends through the bore. The bushing is between an inner surface of the bore and the guide rod fastener. A circumference of the bushing contacts the inner surface. A radial clearance is between the inner surface and the guide rod fastener. The radial clearance is perpendicular to the axis.

According to another embodiment, a vehicle disc brake assembly may comprise, individually and/or in combination, one or more of the following features: a brake caliper having a lug, a guide rod fastener secured to a guide rod, and an elastic bushing. A bore extends through the lug and has an axis. The guide rod fastener extends through the bore. The bushing is between an inner surface of the bore and the guide rod fastener. The bushing has a sleeve portion with an opening through which the axis passes and the guide rod fastener extends. The bushing also has at least one band on an exterior surface of the sleeve portion. A circumference of the at least one band contacts the inner surface. A radial clearance is between the inner surface and the sleeve portion. The radial clearance is perpendicular to the axis.

According to another embodiment, a vehicle disc brake assembly may comprise, individually and/or in combination, one or more of the following features: a brake caliper having a lug, a guide rod fastener secured to a guide rod, and an elastic bushing. A bore extends through the lug and has an axis. The guide rod fastener extends through the bore. The bushing is between the lug and the guide rod fastener. A circumference of the bushing contacts the lug. A radial clearance is between lug and the guide rod fastener. The radial clearance is perpendicular to the axis.

A potential advantage of an embodiment is reduced noise, vibration, and harshness for a vehicle disc brake assembly without increasing manufacturing complexity or cost. Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
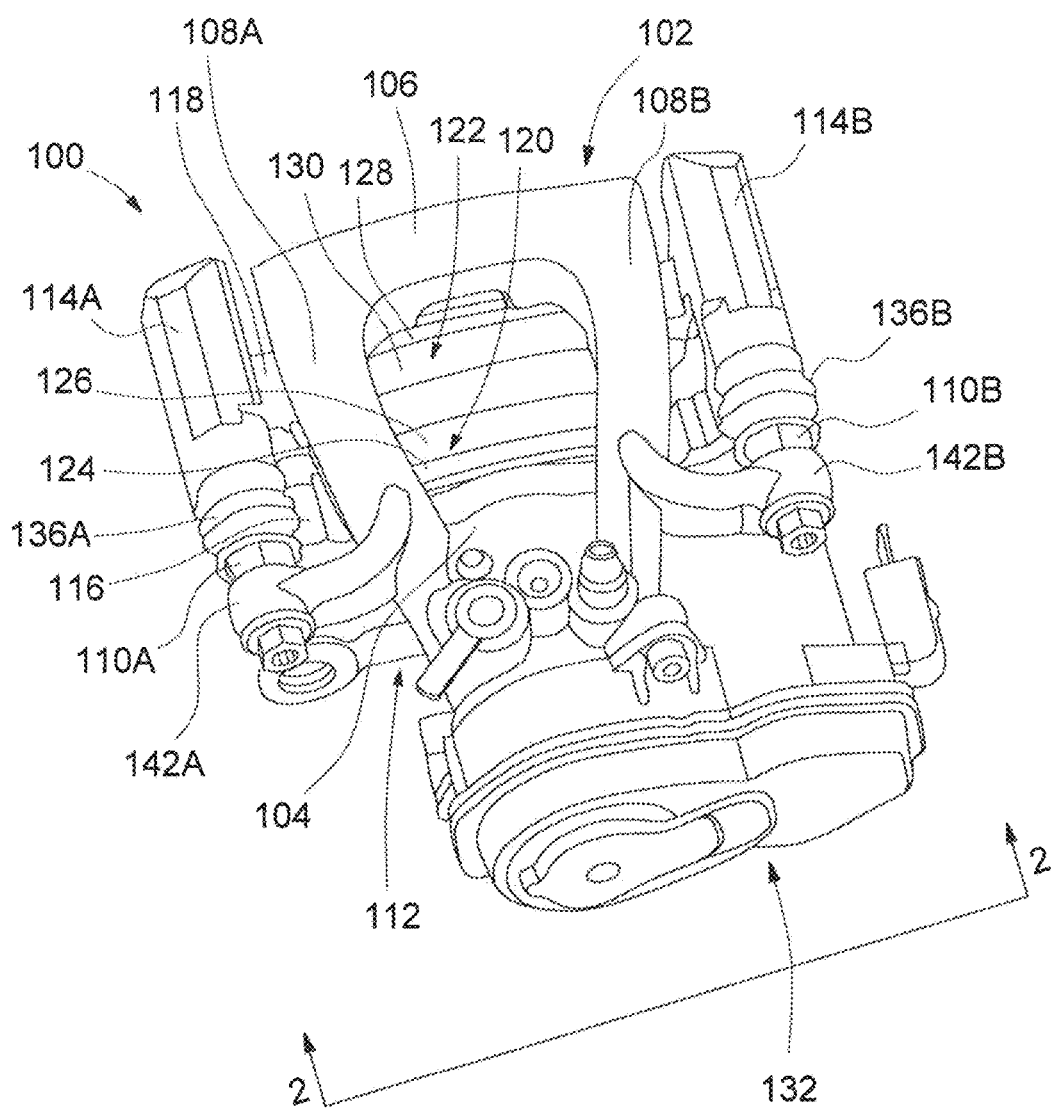
FIG. 1 is a perspective view of a portion of a vehicle disc brake assembly having a bushing in accordance with a first embodiment of the present invention.
Figure 2:
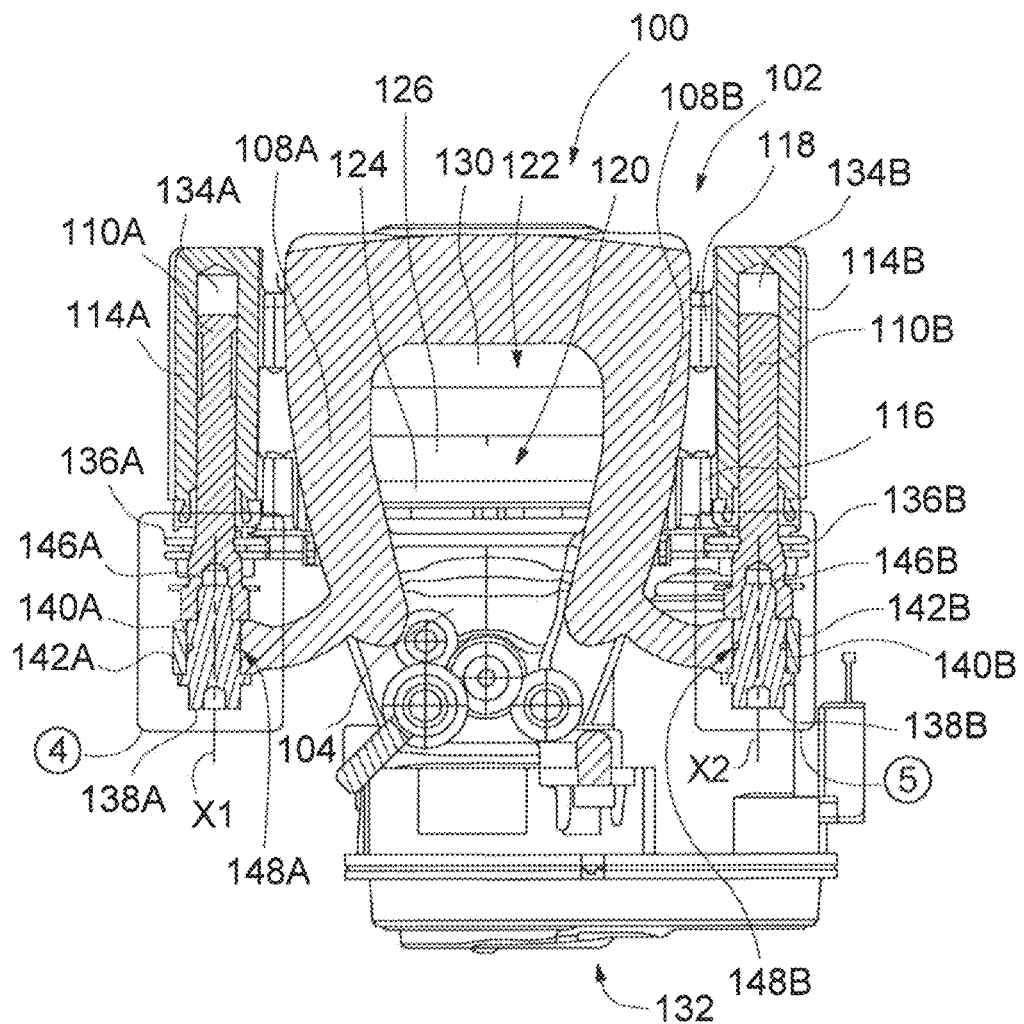
FIG. 2 is a section view taken along line 2-2 of FIG. 1 and showing the bushing.

Referring now to the drawings, there is illustrated in FIGS. 1 and 2, a portion of a vehicle disc brake assembly, indicated generally at 100. The general structure and operation of the brake assembly 100 is conventional in the art. Thus, only those portions of the brake assembly 100 which are necessary for a full understanding of this invention will be explained and illustrated in detail. Also, although this invention will be described and illustrated in connection with the particular vehicle disc brake assembly disclosed herein, it will be appreciated that this invention may be used in connection with other vehicle disc brake assemblies, if so desired. For example, this invention may be used in connection with the disc brake assembly disclosed in U.S. Patent Publication No. 2014/0231191 to Morais et al., the disclosure of which is incorporated herein by reference in entirety.

The brake assembly 100 is a rod guided or rod sliding type of disc brake assembly and includes a generally C-shaped caliper, indicated generally at 102. The caliper 102 includes an inboard leg portion 104 and an outboard leg portion 106 which are interconnected by first and second intermediate bridge portions 108A and 108B, respectively. As will be discussed in detail, the caliper 102 is secured to first and second guide rods 110A and 110B, respectively, which are slidably supported on an anchor bracket, indicated generally at 112. The anchor bracket 112 is, in turn, secured to a stationary component (not shown) of the vehicle by suitable fasteners. For example, the stationary component can be a steering knuckle when the brake assembly 100 is installed for use on the front of the vehicle or an axle flange or drum-in-hat adapter when the brake assembly 100 is installed for use on the rear of the vehicle.

In the illustrated embodiment, the anchor bracket 112 includes first and second axially and outwardly extending arms 114A and 114B, respectively. The first and second arms 114A and 114B, respectively, are interconnected at their inboard ends by an inner tie bar 116 and are interconnected at their outboard ends by an outer tie bar 118. Mounted on the anchor bracket 112 are an inboard brake shoe assembly, indicated generally at 120, and an outboard brake shoe assembly, indicated generally at 122. The inboard brake shoe 120 includes an inboard backing plate 124 and an inboard friction pad 126. Similarly, the outboard brake shoe 122 includes an outboard backing plate 128 and an outboard friction pad 130.

An actuation means is provided for effecting operation of the brake assembly 100. As illustrated, the brake assembly 100 has a brake piston (not shown) disposed in a counterbore or recess formed in the inboard leg 104 of the caliper 102. The actuation means may be a suitable type known to those skilled in the art. As illustrated, the brake piston may be actuated by hydraulic pressure between a non-braking position and a braking position. The brake piston may subsequently be supported in the braking position by an electromechanical actuator, indicated generally at 132. Alternatively, the actuation means may be of a hydraulic, electrical, pneumatic, or mechanical type, or a combination thereof. When the brake assembly 100 is actuated, for example by a driver or a vehicle controller, a brake loading is developed on the brake assembly 100.

The first rod 110A is disposed in a corresponding first non-threaded bore 134A provided in the first arm 114A and the second rod 110B is disposed in a corresponding second non-threaded bore 134B provided in the second arm 114B. First and second boot seals 136A and 136B, respectively, may be provided between the caliper 102 and the first and second rods 110A and 110B, respectively. A pair of first and second threaded fasteners 138A and 138B, respectively, are provided to secure the corresponding first and second rods 110A and 110B, respectively, to the caliper 102. The first and second rods 110A and 110B, respectively, slidably secure the caliper 102 to the anchor bracket 112.

The first fastener 138A extends through a first bore or through opening 140A provided in a first lug 142A of the caliper 102. The first fastener 138A extends along a first axis X1 and is secured tightly—i.e., without slack or play—to the first rod 110A. For example, a threaded portion 144A of the first fastener 138A may be screwed into a corresponding internally threaded bore 146A provided inside the first rod 110A. An annular first fastener bushing, indicated generally at 148A, is secured between the first fastener 138A and first lug 142A.

Similarly, the second fastener 138B extends through a second bore or through opening provided in a second lug 142B of the caliper 102 along a second axis X2. The second fastener 138B is secured tightly—i.e., without play—to the second rod 110B. For example, an externally threaded portion 144B of the second fastener 138B may be screwed into a corresponding internally threaded bore 146B provided inside the second rod 110B. An annular second fastener bushing, indicated generally at 148B, is secured between the second fastener 138B and second lug 142B.

Figure 3:
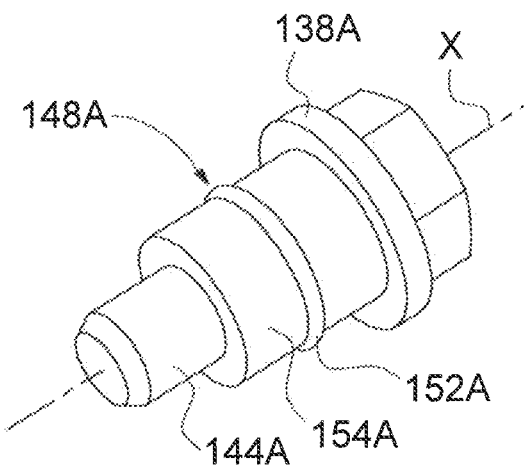
FIG. 3 is a perspective view of the bushing of FIG. 2.
Figure 4:
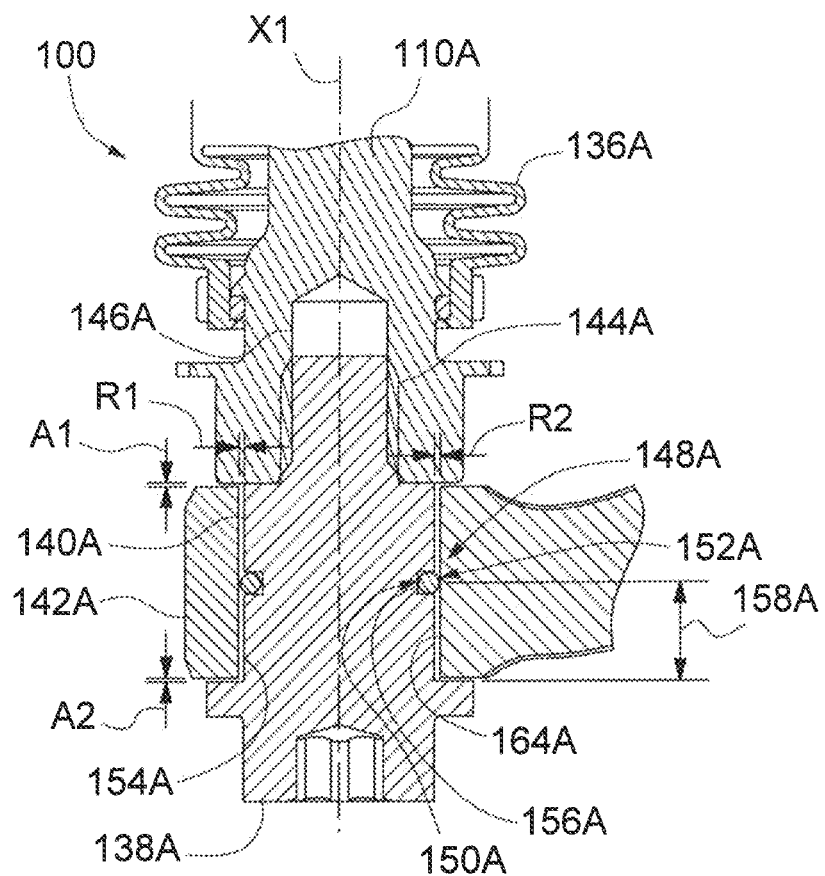
FIG. 4 is a first enlarged portion of FIG. 2.
Figure 5:
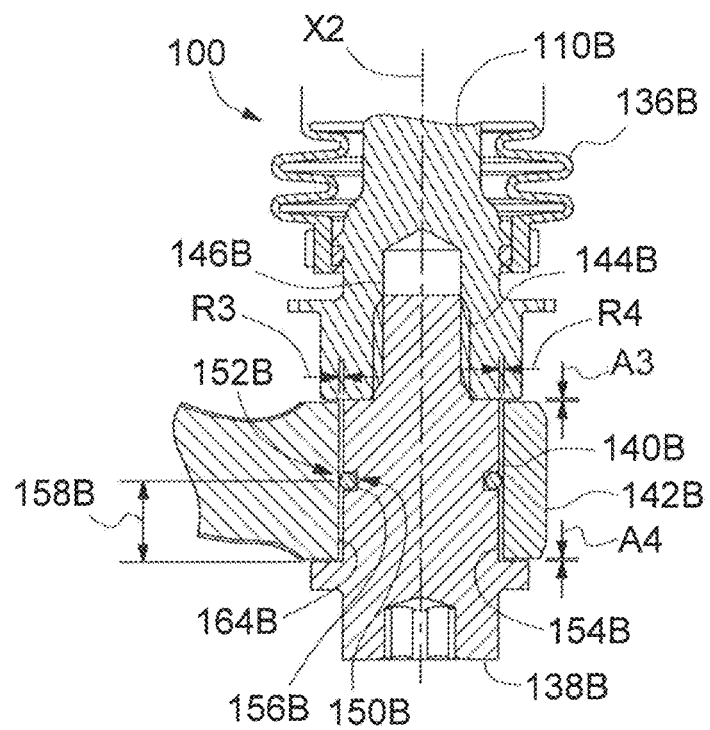
FIG. 5 is a second enlarged portion of FIG. 2.

Referring now to FIGS. 3-5, there is illustrated in detail the first and second fasteners 138A and 138B, respectively, and the first and second bushings 148A and 148B, respectively. Description of the first bushing 148A, as well as portions of the brake assembly 100 associated with or interacting with the first bushing 148A, also corresponds to the second bushing 148B and portions of the brake assembly 100 associated with or interacting with the second bushing 148B. The first fastener 138A is generally symmetric about the first axis X1.

The first bushing 148A is a torus having a substantially circular cross section, similar to an O-ring, and is fabricated from an elastic material such as rubber. Alternatively, the first bushing 148A may have other than a circular cross section. For example, the first bushing 148A may have a rectilinear cross section. Alternatively, the first bushing 148A may be fabricated from other materials. For example, the first bushing 148A may be fabricated from plastic material such as nylon. The first bushing 148A has an inner circumference surface, indicated generally at 150A, and an outer circumference surface, indicated generally at 152A.

As discussed, the first guide rod 110A is secured against the first fastener 138A along the first axis X1. The first bushing 148A establishes first and second axial clearances or air gaps A1 and A2, respectively, and a radial clearance or air gap R1. An outer surface 154A of the first fastener 138A has an annular groove 156A circumferentially around the first axis X1 and at an axial midpoint, indicated generally at 158A, of the first fastener 138A. As illustrated, the groove 156A is perpendicular to the first axis X1, but the groove 156A may be other than perpendicular to the first axis X1. For example, the groove 156A may be angled relative to the first axis X1.

A cross section of the groove 156A generally corresponds with the cross section of the first bushing 148A such that the first bushing 148A may be positioned in the groove 156A. For example, as illustrated, the circular cross section of the first bushing 148A fits within a rectilinear cross section of the groove 156A. Additionally, the first bushing 148A may have a larger cross section than the groove 156A and be restrained in the groove 156A by an interference fit. Alternatively, the first bushing 148A may be restrained in the groove 156A by inward radial compression towards the first axis X1 or other suitable means. The first bushing 148A is also in contact with an inner surface 164A of the first bore 140A such that a friction force is generated to damp axial movement of the first fastener 138A in the first bore 140A.

The first and second axial clearances A1 and A2, respectively, are parallel to the first axis X1. The first axial clearance A1 is between the first guide rod 110A and the first lug 142A and the second axial clearance A2 is between the first fastener A2 and the first lug 142A. The first and second axial clearances A1 and A2, respectively, may increase and decrease from what is shown in FIG. 4 as the first guide rod 110A and first fastener 138A move together along the first axis X1 relative to the first lug 142A within the first and second axial clearances A1 and A2. Similarly, the second bushing 148B establishes third and fourth axial clearances A3 and A4, respectively.

The radial clearance R1 is perpendicular to the first axis X1 and established by the outer surface 152A having a greater diameter than the first fastener 138A. The first bushing 148A remains in contact with the first lug 142A for a full circumference of the first bushing 148A—i.e., the outer surface 152A contacts the inner surface 164A for 360°. The radial clearance R1 is between the first fastener 138A and the first lug 142A. As one skilled in the art will recognize, the radial clearance R1 extends circumferentially around the first fastener 138A such that a second radial clearance R2 is equal to the radial clearance R1 when the first bore 140A and first bushing 148A are concentric. Similarly, the second bushing 148B establishes third and fourth radial clearances R3 and R4, respectively.

Figure 6:
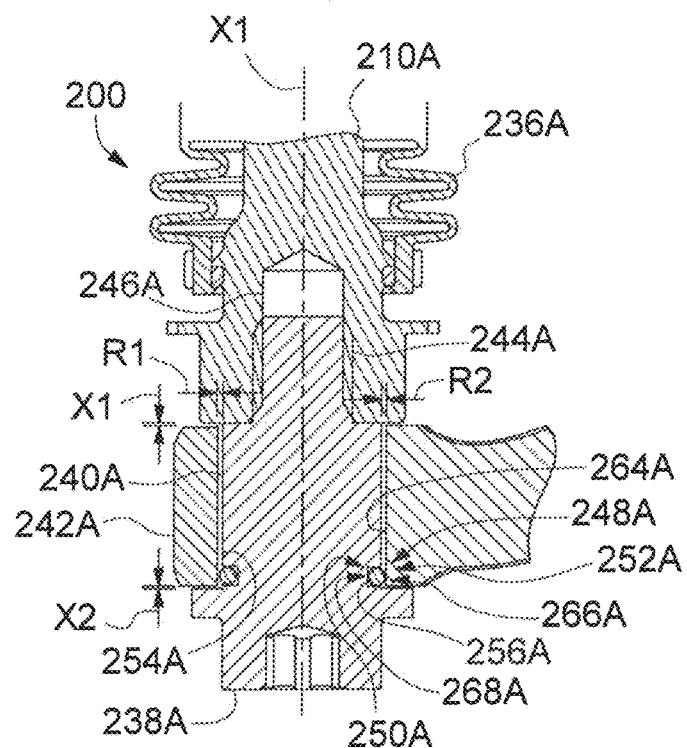
FIG. 6 is a section view of a portion of a vehicle disc brake assembly having a bushing in accordance with a second embodiment of the present invention.
Figure 7:
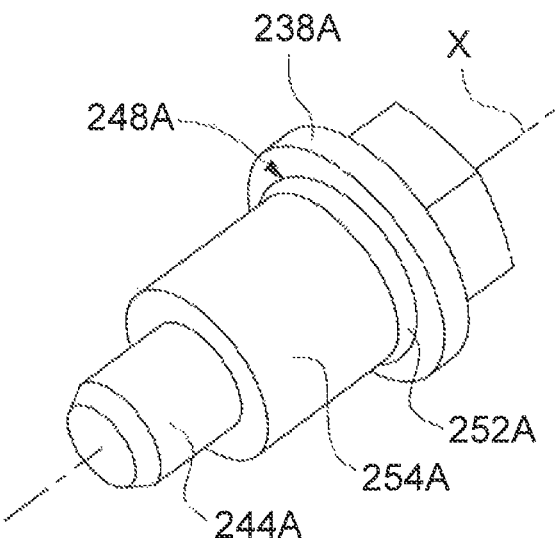
FIG. 7 is a perspective view of the bushing of FIG. 6.

Referring now to FIGS. 6 and 7, there is illustrated a portion of a vehicle disc brake assembly 200. Because the brake assembly 200 is a variation of the brake assembly 100 of FIGS. 1-5, like reference numerals, increased by 100, designate corresponding parts in the drawings and detailed description thereof will be omitted.

A first fastener bushing 248A is located between an axial endpoint, indicated generally at 266A, of a first lug 242A and an axial endpoint, indicated generally at 268A, of a first guide rod fastener 238A.

Figure 8:
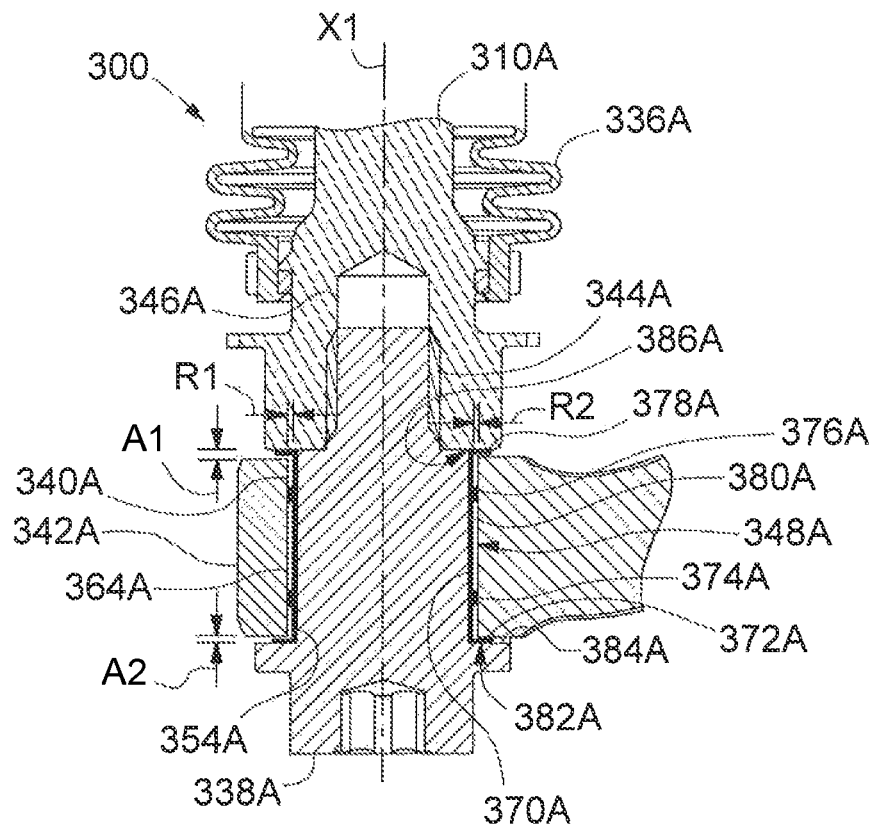
FIG. 8 is a section view of a portion of a vehicle disc brake assembly having a bushing in accordance with a third embodiment of the present invention.
Figure 9:
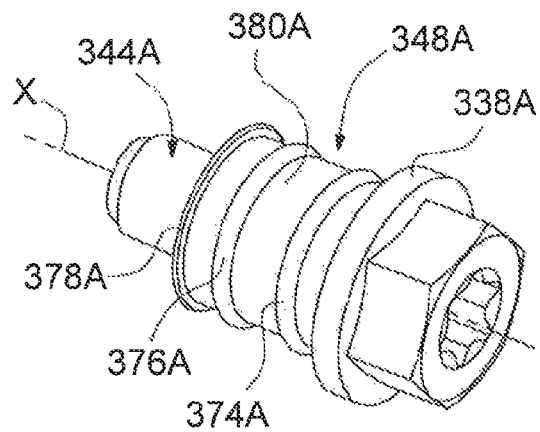
FIG. 9 is a perspective view of the bushing of FIG. 8.

Referring now to FIGS. 8 and 9, there is illustrated a portion of a vehicle disc brake assembly 300. Because the brake assembly 300 is a variation of the brake assembly 100 of FIGS. 1-5, like reference numerals, increased by 200, designate corresponding parts in the drawings and detailed description thereof will be omitted.

A first fastener bushing 348A has a sleeve portion 370A, a first flange 372A, a first band 374A, a second band 376A, and a second flange 378A. As illustrated, the first flange 372A, first band 374A, second band 376A, and second flange 378A are formed integrally or monolithically with the sleeve portion 370A. Although the first bushing 348A is illustrated with the first and second bands 374A and 376A, respectively, the first bushing 348A may also be formed with more or less than two bands.

The sleeve 370A is a tube through which a first axis X1 passes and a first fastener 338A extends. The first flange 372A is on an exterior surface 380A of the sleeve 370A. The first flange 372A is at a first end, indicated generally at 382A, of the sleeve 370A and extends circumferentially around the first axis X1, and rests against a fastener flange 384A.

The first and second bands 374A and 376A, respectively, are also on the exterior surface 380A. The first and second bands 374A and 376A, respectively, are semicircular in cross section and are generally perpendicular to the first axis X1. Alternatively, the first and second bands 374A and 376A, respectively, may have other than semicircular cross sections and/or be other than perpendicular to the first axis X1. Outer circumferences of the first and second bands 374A and 376A, respectively, are in contact with an inner surface 364A of a first bore 340A.

The second flange 378A is at a second end, indicated generally at 386A, of the sleeve 370A and extends circumferentially around the first axis X1. The second end 386A is opposite the first end 382A and the first and second bands 374A and 376A, respectively, are between the first and second flanges 372A and 378A, respectively. The first bushing 348A establishes first and second axial clearances or air gaps A1 and A2, respectively, and first and second radial clearances or air gaps R1 and R2, respectively. The first and second radial clearances R1 and R2, respectively, are between the inner surface 364A and the sleeve 370A.

Figure 10:
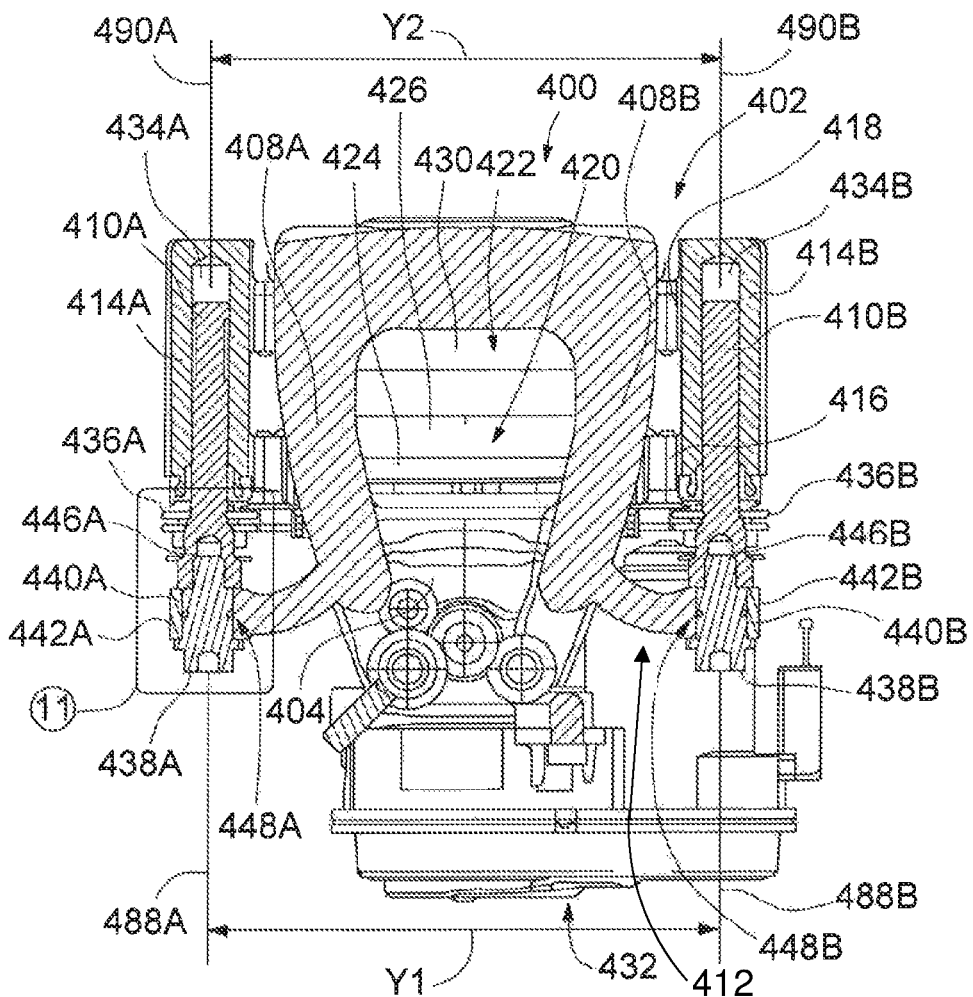
FIG. 10 is a section view of a vehicle disc brake assembly having a bushing in accordance with a fourth embodiment of the present invention.
Figure 11:
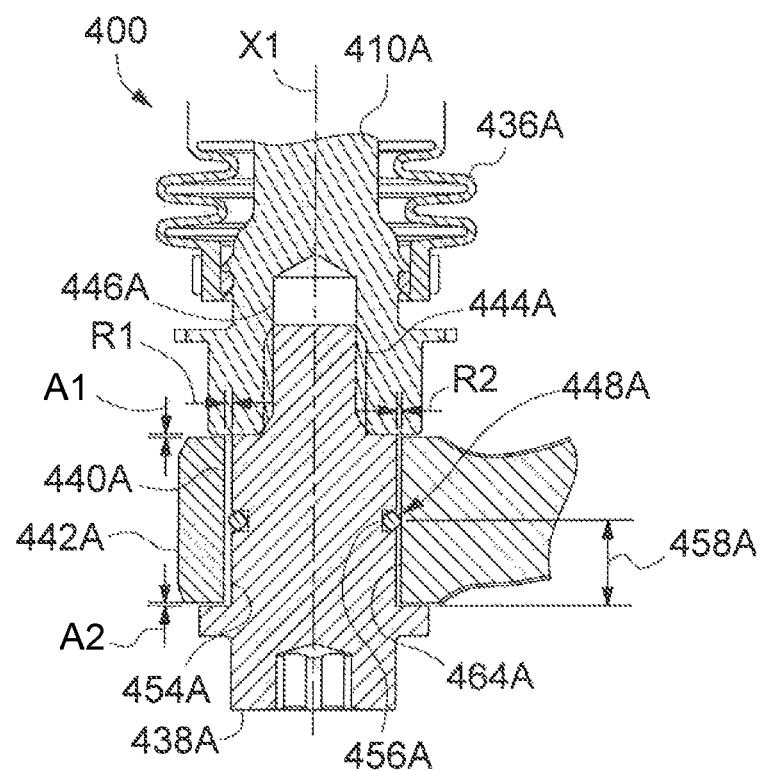
FIG. 11 is an enlarged portion of FIG. 10.

Referring now to FIGS. 10 and 11, there is illustrated a vehicle disc brake assembly 400. Because the brake assembly 400 is a variation of the brake assembly 100 of FIGS. 1-5, like reference numerals, increased by 300, designate corresponding parts in the drawings and detailed description thereof will be omitted. Although illustrated using bushings similar to the first and second bushings 148A and 148B, respectively, the disc brake assembly 400 may also use bushings similar to those illustrated in FIGS. 6-9 or other suitable bushings.

First and second guide rods 410A and 410B, respectively, are spaced apart by a first distance Y1 between a first axial centerline 488A of the first guide rod 410A and a second axial centerline 488B of the second guide rod 410B. First and second anchor bracket bores 434A and 434B, respectively, are spaced apart by a second distance Y2 between a third axial centerline 490A of the first anchor bracket bore 434A and a fourth axial centerline 490B of the second anchor bracket bore 434B. The first and second distances Y1 and Y2, respectively, are generally parallel.

As illustrated, the first distance Y1 is less than the second distance Y2 such that, when the first and second guide rods 410A and 410B, respectively, are inserted into the first and second bores 434A and 434B, respectively, the first and second guide rods 410A and 410B move further apart and the first distance Y1 is increased, although the first distance Y1 remains less than the second distance Y2. As a result, after the first and second guide rods 410A and 410B, respectively, are inserted into the first and second bores 434A and 434B, respectively, a first bore 440A and first bushing 448A are not concentric and first and second radial clearances R1 and R2, respectively, are not equal. Similarly, for a second bushing 448B, there is no longer a constant radial clearance around a guide rod fastener 438B.

The first and second radial clearances R1 and R2, respectively, not being equal develops a preload between the first and second guide rods 410A and 410B, respectively that is applied to an anchor bracket 412. As illustrated, the first radial clearance R1 is greater than the second radial clearance R2 and the first and second guide rods 410A and 410B are biased towards each other. Alternatively, the first distance Y1 may be greater than the second distance Y2, in which case the preload would bias the first and second guide rods 410A and 410B away from each other.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A vehicle disc brake assembly comprising:
   a brake caliper having a lug;
   a bore through the lug, wherein the bore has an axis;
   a guide rod fastener extending through the bore and secured to a guide rod;
   an elastic bushing between an inner surface of the bore and the guide rod fastener, wherein a circumference of the bushing contacts the inner surface; and
   a radial clearance between the inner surface and the guide rod fastener, wherein the radial clearance is perpendicular to the axis;
   a first axial clearance parallel to the axis and between the lug and the guide rod; and
   a second axial clearance parallel to the axis and between the lug and the guide rod fastener.

2. The vehicle disc brake assembly of claim 1 further comprising:
   a groove in a surface of the guide rod fastener, wherein the groove is circumferential around the axis and the bushing is in the groove.

3. The vehicle disc brake assembly of claim 2 wherein the groove is at an axial midpoint of the guide rod fastener.

4. The vehicle disc brake assembly of claim 2 wherein the groove is at an axial endpoint of the guide rod fastener.

5. The vehicle disc brake assembly of claim 1 further comprising:
   a second bore through a second lug of the brake caliper, wherein the second bore has a second axis;
   a second guide rod fastener extending through the second bore and secured to a second guide rod;
   a second elastic bushing between a second inner surface of the second bore and the second guide rod fastener, wherein a second circumference of the second bushing contacts the second inner surface; and
   a second radial clearance between the second inner surface and the second guide rod fastener, wherein the second radial clearance is perpendicular to the second axis.

6. The vehicle disc brake assembly of claim 5 further comprising:
   an anchor bracket having third and fourth bores, wherein the guide rod is a first guide rod slidably supported in the third bore and the second guide rod is slidably supported in the fourth bore;
   a first distance between axial centerlines of the first and second guide rods; and
   a second distance between axial centerlines of the third and fourth bores, wherein the first distance is less than the second distance, the bushing is a first bushing, and the first and second bushings are compressed.

7. The vehicle disc brake assembly of claim 5 further comprising:
   a third axial clearance parallel to the second axis and between the second lug and the second guide rod; and
   a fourth axial clearance parallel to the second axis between the second lug and the second guide rod fastener.

8. A vehicle disc brake assembly comprising:
   a brake caliper having a lug;
   a bore through the lug, wherein the bore has an axis;
   a guide rod fastener extending through the bore and secured to a guide rod;
   an elastic bushing in the bore between the lug and the guide rod fastener, wherein a circumference of the bushing contacts the lug; and
   a radial clearance between the lug and the guide rod fastener, wherein the radial clearance is perpendicular to the axis;
   a first axial clearance parallel to the axis and between the lug and the guide rod; and
   a second axial clearance parallel to the axis and between the lug and the guide rod fastener.

9. The vehicle disc brake assembly of claim 8 further comprising:
   a groove in a surface of the guide rod fastener, wherein the groove is circumferential around the axis and the bushing is in the groove.

10. The vehicle disc brake assembly of claim 8 wherein the bushing comprises:
    a sleeve portion with an opening through which the axis passes and the guide rod fastener extends;
    a first flange at a first end of the sleeve;
    a second flange at a second end of the sleeve, wherein the second end of the sleeve is opposite the first end;
    a first band on an exterior surface of the sleeve portion and having a first circumference; and
    a second band on the exterior surface and having a second circumference, wherein the first and second bands are between the first and second flanges and the first and second circumferences contact an inner surface of the bore.

11. The vehicle disc brake assembly of claim 8 further comprising:
    a second bore through a second lug of the brake caliper, wherein the second bore has a second axis;
    a second guide rod fastener extending through the second bore and secured to a second guide rod;
    a second elastic bushing in the second bore between the second lug and the second guide rod fastener, wherein a second circumference of the second bushing contacts the second lug; and
    a second radial clearance between the second lug and the second guide rod fastener, wherein the second radial clearance is perpendicular to the second axis.

12. The vehicle disc brake assembly of claim 11 further comprising:
    an anchor bracket having third and fourth bores, wherein the guide rod is a first guide rod slidably supported in the third bore and the second guide rod is slidably supported in the fourth bore;
    a first distance between axial centerlines of the first and second guide rods; and
    a second distance between axial centerlines of the third and fourth bores, wherein the first distance is less than the second distance, the bushing is a first bushing, and the first and second bushings are compressed.

13. A vehicle disc brake assembly comprising:
    a brake caliper having a bore through the lug, wherein the bore has an axis;
    a guide rod fastener extending through the bore and secured to a guide rod;
    an elastic bushing between an inner surface of the bore and the guide rod fastener, wherein a circumference of the bushing contacts the inner surface; and a radial clearance between the inner surface and the guide rod fastener, wherein the radial clearance is perpendicular to the axis;
a first axial clearance between the lug and the guide rod; and
a second axial clearance between the lug and the guide rod fastener.

14. The vehicle disc brake assembly of claim 13 further comprising:
a groove in a surface of the guide rod fastener, wherein the groove is circumferential around the axis and the bushing is in the groove.

15. The vehicle disc brake assembly of claim 14 wherein the groove is at an axial midpoint of the guide rod fastener.

16. The vehicle disc brake assembly of claim 13 further comprising:
a second bore through a second lug of the brake caliper, wherein the second bore has a second axis;
a second guide rod fastener extending through the second bore and secured to a second guide rod;
a second elastic bushing between a second inner surface of the second bore and the second guide rod fastener, wherein a second circumference of the second bushing contacts the second inner surface; and
a second radial clearance between the second inner surface and the second guide rod fastener, wherein the second radial clearance is perpendicular to the second axis.

17. The vehicle disc brake assembly of claim 16 further comprising:
a third axial clearance parallel to the second axis and between the second lug and the second guide rod; and
a fourth axial clearance parallel to the second axis between the second lug and the second guide rod fastener.

* * * * *